United States Patent [19]
Harrison

[11] Patent Number: 5,526,734
[45] Date of Patent: Jun. 18, 1996

[54] APPARATUS FOR COOKING BAGELS

[75] Inventor: Robert G. Harrison, Seattle, Wash.

[73] Assignee: PMI International Corporation, Seattle, Wash.

[21] Appl. No.: 372,518

[22] Filed: Jan. 13, 1995

[51] Int. Cl.$^6$ .............................. A23L 1/00; A47J 27/10
[52] U.S. Cl. ............................. 99/339; 99/410; 99/412; 99/476; 99/477; 219/400; 126/21 A
[58] Field of Search ........................ 99/339, 404, 405, 99/410, 412, 415, 450, 476, 477; 219/400; 126/21 A

[56] References Cited

U.S. PATENT DOCUMENTS

| | | | |
|---|---|---|---|
| 3,463,077 | 8/1969 | Lescure | 99/410 |
| 3,801,331 | 4/1974 | Sano et al. | 99/403 |
| 4,591,698 | 5/1986 | Chang | 219/400 |
| 4,672,179 | 6/1987 | Onishi et al. | 99/403 |
| 4,995,312 | 2/1991 | Leiros | 99/403 |

Primary Examiner—David Scherbel
Assistant Examiner—Reginald L. Alexander
Attorney, Agent, or Firm—Hughes, Multer & Schacht

[57] ABSTRACT

Bagel cooking apparatus which includes a casing divided into a lower zone in which uncooked bagels can be boiled and an upper, oven zone for subsequently baking the boiled bagels. A cam mechanism with an externally accessible operator is provided to move a bagel-supporting structure housed in the casing between the lower, boiler zone and the upper, oven zone. A control system allows a user to independently control the operation of the bagel cooker during the boiling and baking steps.

14 Claims, 7 Drawing Sheets

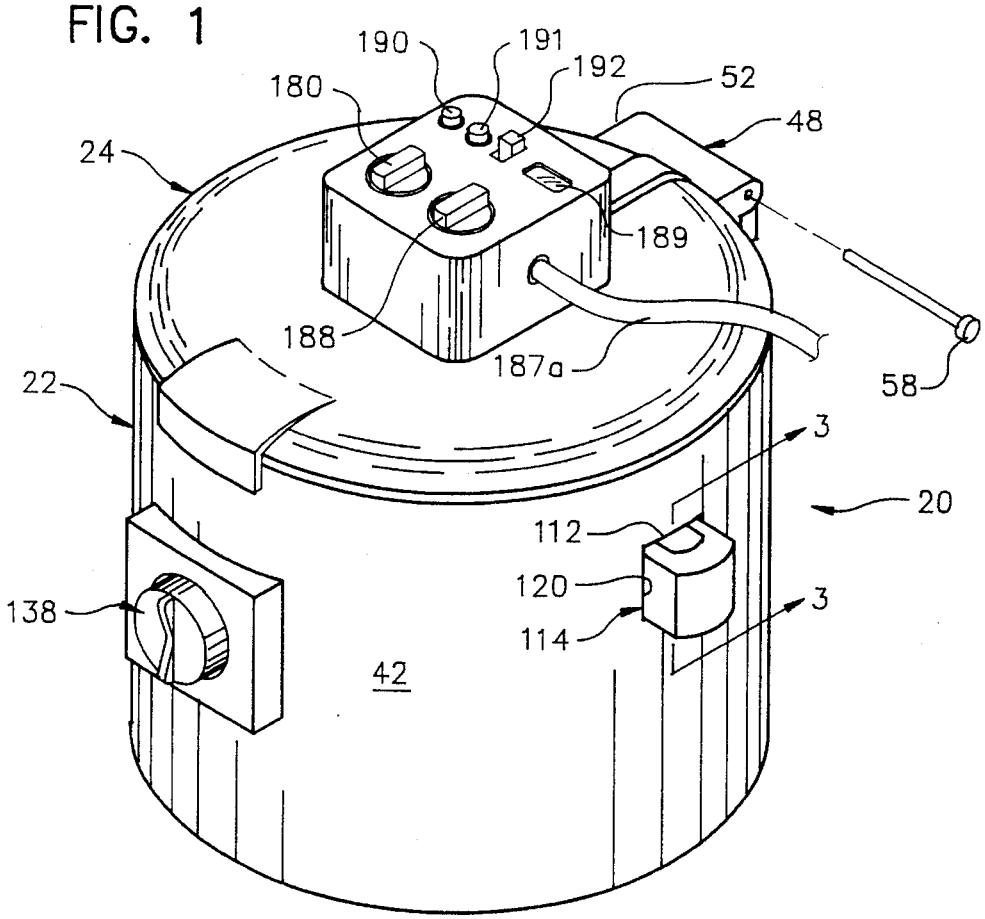
FIG. 1
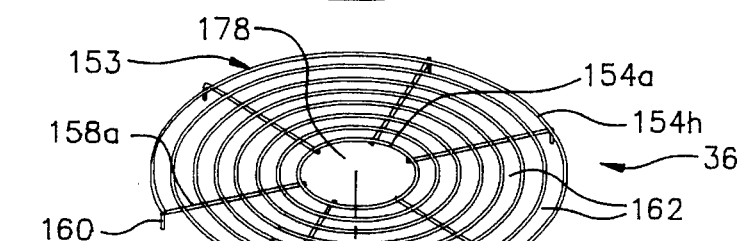
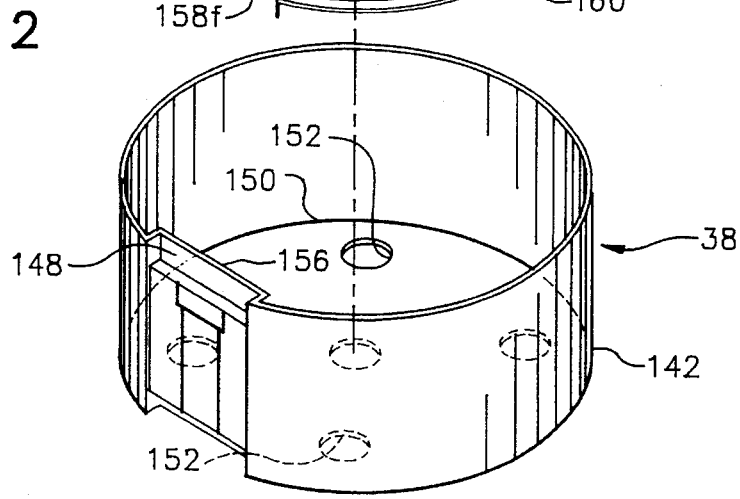
FIG. 2

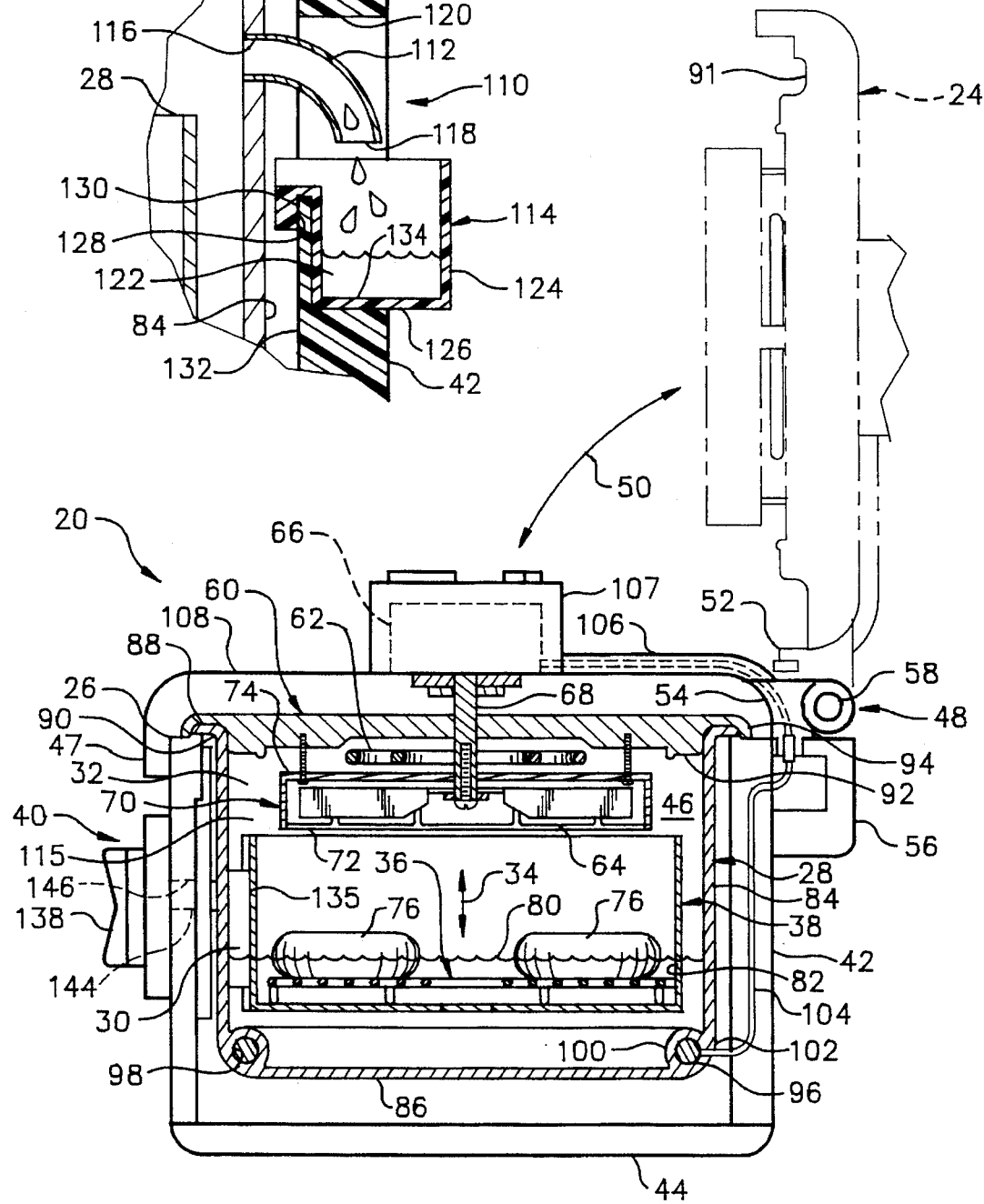

APPARATUS FOR COOKING BAGELS

BACKGROUND OF THE INVENTION

Bagels are ring-shaped rolls with a tough, chewy texture. They are prepared by first boiling and then baking a kneaded and proofed bread dough.

Bagels have become a universal food, and automated, commercial scale machines for cooking them in large quantities are in widespread use. However, comparable bagel cooking devices suitable for home use are not available. Instead, the cook has to boil the bagels in a pan of water, remove and drain the boiled bagels, transfer the drained bagels to a baking sheet, and then bake the bagels. In this age of bread and pasta makers and other automated appliances, many find the above-described, conventional technique for cooking bagels onerous if not totally unsatisfactory.

SUMMARY OF THE INVENTION

There have now been invented and disclosed herein certain new and novel appliances which are scaled for home and other low volume applications and which greatly simplify the task of boiling and then baking the proofed and shaped bagel dough.

Generally speaking, these novel appliances combine an electrically heated boiler with a convection or other oven in a single unit. A displaceable rack allows the uncooked bagels to be lowered into the boiler to boil them and to-then be elevated into the oven section of the unit to complete the cooking process. A control unit operates the boiling and baking sections of the unit for appropriate user-selectable periods of time and warns the user when each of the two cooking steps is completed.

The objects, features, and advantages of the invention will be apparent to the reader from the foregoing and the appended claims and as the ensuing detailed description and discussion proceeds in conjunction with the accompanying drawings.

BRIEF DESCRIPTION OF THE DRAWINGS

FIG. 1 is an external view of a bagel cooker embodying the principles of the present invention;

FIG. 2 is an exploded view of a vertically movable bagel support structure utilized in the bagel cooker of FIG. 1 to lower the bagels into the boiler section of the cooker and to subsequently raise the bagels to the oven section of the cooker;

FIG. 5 is a fragmentary section through the external casing of the bagel cooker, taken to show the details of an arrangement employed to vent and capture condensate formed during the operation of the bagel cooker;

FIG. 6 is a vertical section through the bagel cooker with the FIG. 2 bagel support structure in a lower position in which the bagels are positioned in the boiler section of the bagel cooker for the first step of the cooking process;

DETAILED DESCRIPTION OF THE INVENTION

Figure 7:
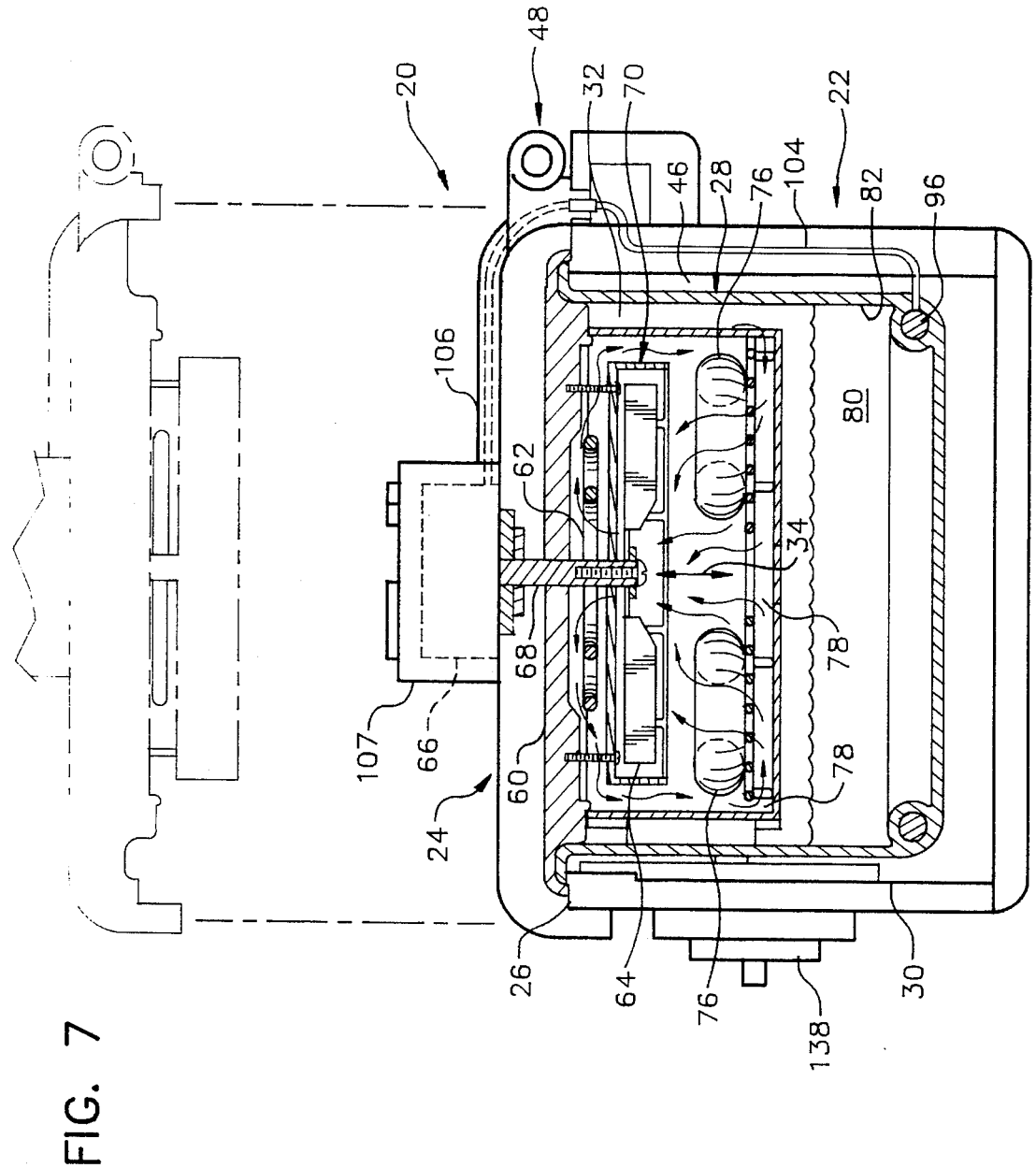
FIG. 7 is a view similar to FIG. 6 but with the bagel support structure elevated into the oven section of the bagel cooker to bake and thereby complete the cooking of the bagels.

Referring now to the drawings, FIGS. 1, 6, and 7 depict a bagel cooker 20 constructed in accord with, and embodying, the principles of the present invention. Bagel cooker 20 includes a casing 22 and a hinged cover 24. Housed in casing 22 and supported from the upper rim 26 of that casing is an imperforate inner casing or pan 28 with a lower zone 30 in which uncooked bagels are boiled (see FIG. 6) and an upper zone 32 in which the boiled bagels are subsequently baked (see FIG. 7). Supported in casing 28 for bidirectional, vertical movement as suggested by arrow 34 in FIGS. 6 and 7 is a rack 36 on which the raw bagels are placed and a rack support 38 which can be displaced in the arrow 34 directions by the cam (rack and pinion) mechanism 40 depicted in FIGS. 3 and 4. The operation of bagel cooker 20 is controlled by the system depicted in FIG. 9 and identified by reference character 41.

Referring still to FIGS. 1, 6, and 7, the outer housing or casing 22 of bagel cooker 20 has a vertically oriented, cylindrical side wall 42 and a flat bottom wall 44. Side wall 42 and bottom wall 44 are preferably insulated to isolate a user from the high temperatures reached in the bagel cooker interior 46.

The cover or lid 24 of bagel cooker 20 is a flat, circular, also preferably insulated component with a depending, integral, peripheral flange 47 which fits around the periphery of outer casing side wall 42 adjacent the upper edge 26 of the casing. Lid 24 keeps hot gases and vapors from escaping the interior 46 of the bagel cooker and posing a threat of injury to the user of that appliance. However, cover 24 is not clamped to casing 22 to avoid a potentially dangerous build-up of pressure in the bagel cooker interior 46.

As shown in FIG. 6, a hinge 48 supports cover 24 from bagel maker outer casing side wall 42 for pivotable movement between the closed position just described and the open position shown in phantom lines as indicated by bidirectional arrow 50. Hinge 48 includes one leaf 52 fixed to the peripheral flange 47 of cover 24 and a second, complementary leaf 54 mounted to a bracket 56 which is, in turn, mounted to the side wall 42 of bagel cooker outer casing 22. The two hinge leafs 52 and 54 are connected by a conventional pivot pin 58. Hinge 48 will also typically include an over-center mechanism (not shown) for retaining cover 24 in the illustrated open position.

The cover 24 of bagel cooker 20 supports a cover 60 for inner casing 28 and a convection heating unit which includes heating coil 62, convection fan 64, and fan motor 66. Fan 64 is mounted to the lower end of the vertically extending fan motor output shaft 68. The fan is surrounded by a protective shroud 70 with an open lower end 72 which allows fan 64 to circulate air into the upper, oven zone 32 of the bagel cooker interior.

Heating element 62 is typically a conventional resistance heater configured to surround the shaft 68 of fan motor 66.

Heater 62 is mounted in any convenient manner to inner casing cover 60 between and in spaced relationship cover 60 and the top 74 of fan shroud 70. This allows air to be circulated first over the heater to increase its temperature, then downwardly past fan shroud 70 and then up through bagel-supporting rack 36 to bake the bagels 76 being cooked as indicated by the arrows collectively identified by reference character 78 in FIG. 7.

Before the bagels 76 are baked, however, they are first boiled as is conventional in cooking bagels. This step is carried out in the lower, boiling zone 30 of bagel cooker 20 in a body 80 of boiling water contained in the lower reaches 82 of bagel cooker inner casing 28. That component of the bagel cooker has an open top, panlike configuration defined by a cylindrical side wall 84 and a flat, integral, circular bottom wall 86.

Container or inner casing 28 is supported from the upper edge 26 of bagel cooker outer casing 22 by an integral, outwardly directed, circumferentially extending flange 88 located at the upper end 90 of inner casing side wall 84. With the cover 24 of bagel cooker 20 closed, flange 88 is seated in a complementary, downwardly opening recess 91 formed in the lower or inner side 92 of the cover 60 for the inner casing. This forms a primary seal to isolate the user from hot gases and vapors generated in the interior of bagel cooker 20 during the operation of that appliance. Primary sealing is promoted by dimensioning the flangelike part 94 of inner casing cover 60 beyond recess 91 so that it will be seated on the upper edge 26 of bagel cooker outer casing side wall 42 when the bagel cooker cover 24 is closed.

Referring still to FIGS. 6 and 7, the water 80 in pan component 28 is boiled by a resistance heater 96 which is installed in a hollow passage 98 through an integral, peripheral boss 100 at the lower end 102 of inner casing side wall 42. Heater 96 operates on electrical energy supplied through a line 104 extending from the heater upwardly through bagel cooker outer casing side wall 42, the leafs of hinge 48, and beneath an external cover or shield 104 into a box 107 which is mounted to the top 108 of bagel cooker cover 24. Box 107 houses bagel cooker control system 41 as well as convection fan motor 66.

Gases generated by the boiling of the water 80 in bagel cooker inner pan 28 have the potential of causing a potentially dangerous buildup of pressure in the interior 46 of the bagel cooker. This buildup of pressure is avoided by a vent system 110 (see FIGS. 1 and 5) which includes a vent tube 112 and a drip cup 114. Vent tube 112 communicates with the interior 115 of pan component 28 through an inlet opening 116 in the side wall 84 of the pan. The vent tube has a generally quarter circle configuration and terminates in a downwardly facing outlet 118. Outlet 118 is located in an opening 120 in the side wall 42 of bagel cooker outer casing 22 directly above drip cup 114. The drip cup captures condensate 122 formed from steam generated in the bagel boiling step.

Drip cup 114 has integral side and bottom walls 124 and 126 with a downwardly opening recess 128 being provided in drip cup side wall 124. A complementary, vertically extending flange 130 at the inner side 132 of bagel cooker casing side wall 42 at the lower end of the opening 120 in that side wall fits into recess 128. That removably secures the drip cup to casing side wall 42 with the bottom wall 126 of the drip cup seated on a ledge 134 at the lower end of the opening. Drip cup 114 can be removed to empty condensate 122 simply by moving it upwardly and then outwardly. These steps are reversed to replace the empty cup in secured relationship to the bagel cooker outer casing side wall 42.

Referring now to FIGS. 3, 4, 6, and 7, the cam mechanism 40 provided to move bagel-supporting rack 36 in the arrow 34 directions between boiling zone 30 and baking or oven zone 32 includes an elongated rack 135, a pinion 136, and an external operator or knob 138. Rack 135 has the customary teeth 140. The cam mechanism rack is mounted in a vertical orientation and in any convenient manner to the side wall 142 of the support 38 for, and surrounding, bagel rack 36.

Figure 3:
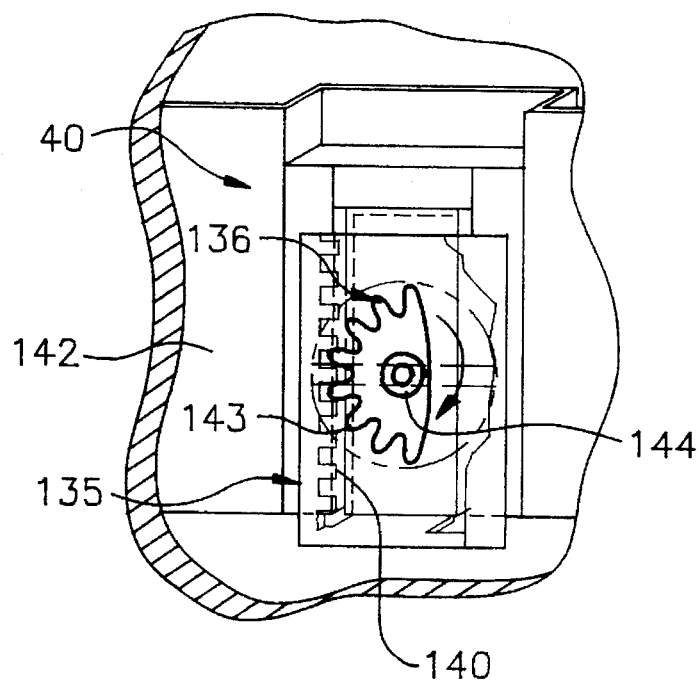
FIGS. 3 and 4 are fragmentary views of the bagel cooker showing rack and pinion components of a unit which allows the user to shift the bagel support structure between the boiler and oven sections of the bagel cooker.
Figure 4:
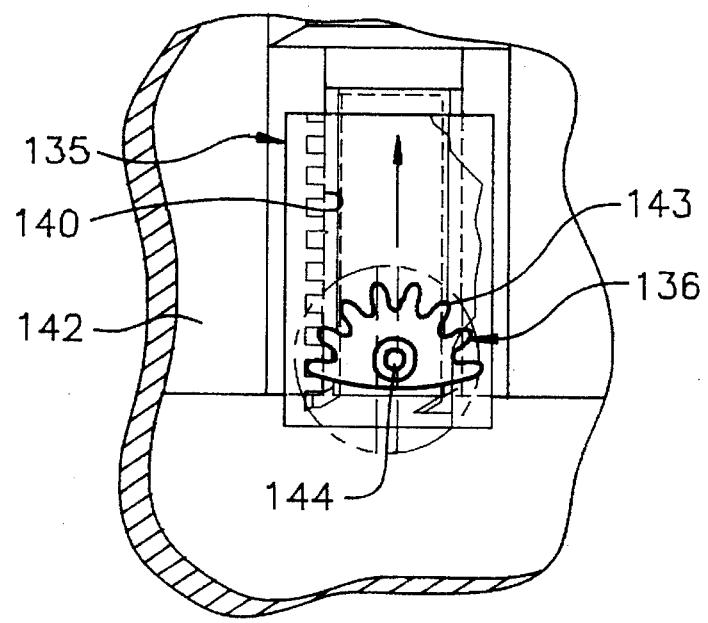

Pinion 136 has teeth 143 which mesh with the teeth 140 on rack 135. Pinion 136 is attached to the inner end of a shaft 144 which extends through the side wall 84 of bagel cooker pan 28 and the side wall 42 of the cooker's outer casing 24 and is rotatably supported in an opening 146 in the outer casing side wall. Knob 138 is fixed to the outer end of shaft 144 for rotation with the shaft. Consequently, rotation of knob 138 in the counterclockwise direction (as shown in FIGS. 3 and 4) will move cam mechanism rack 135, bagel rack support 38, and bagel rack 36 downwardly in pan 28 toward and to boiler zone 30. Conversely, rotation of external knob 138 in the opposite, clockwise direction will move the cam mechanism rack, bagel rack support, and bagel rack upwardly into the oven zone 32 in the bagel cooker. Friction or a detent arrangement between the knob and outer casing side wall 42 (not shown) can be employed to retain the bagel rack support, the bagel rack, and the bagels 76 being baked in the oven zone of bagel cooker 20.

The details of the bagel rack and its support thus raised and lower by cam mechanism are not critical. In the exemplary, illustrated embodiment of the invention, the rack support 38 is an open topped, sheet metal component with an indentation 148 in its side wall 142 for the rack component 135 of cam mechanism 40 (see FIGS. 2 and 8). The bagel rack support also has a flat bottom wall 150 with a set of openings 152 through which water heated by resistance element 96 can circulate to boil the bagels 76 being cooked.

Bagel rack 36 is made up of a flat array 153 of rings or circular rods 154a–154h with the outer ring 154h being interrupted to accommodate the segment 156 of bagel rack support 38 bounding the inner end of the indentation 148 in which the rack 135 of cam mechanism 40 is mounted. Rings 154a–154h are maintained in the illustrated, concentric, flat array by bonding them to equiangularly arranged, radially extending rods 158a–158f. The outer ends of rods 158a–158f are bent downwardly to form legs 160. These legs support the flat array 153 of rings 154a–154h in spaced relationship to the bottom wall 150 of bagel rack support 38. This allows boiling water 80 to freely circulate up through the openings 152 in the bottom 150 of the rack and into contact with the bagels 76 being boiled. The interstices 162 in the array of rings 154a–154h allows the boiling liquid to freely reach the upper parts of bagels 76.

Figure 8:
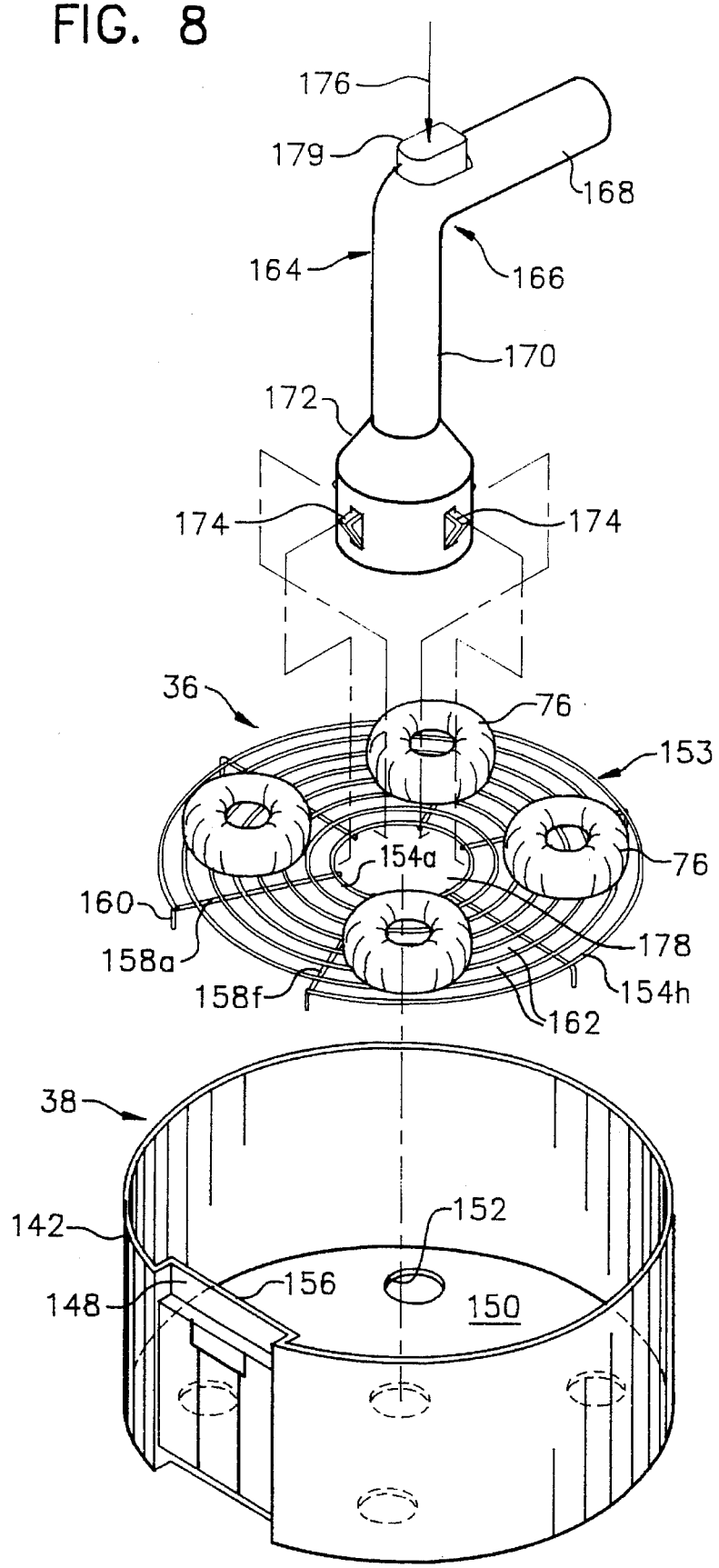
FIG. 8 is an exploded view showing a detachable accessory which can be used to safely remove a rack of the bagel-support structure from the hot oven section of the bagel cooker.

Also shown in FIG. 8 is an accessory 164 for removing a hot rack 38 and baked bagels 76 from bagel cooker 20. This accessory includes an L-shaped component 166 providing a handle 168 and a depending, integral stem 170 with an enlarged base 172 housing a set of four, conventional, spring-loaded detents 174. Moving accessory 164 downwardly in the arrow 176 direction results in the base 172 of the accessory passing through the central opening 176 in bagel rack 38 and in detents 174 consequently being first displaced towards base 172 and then springing back to the illustrated positions to trap them beneath bagel rack 38. Thereafter, once the rack and bagels 76 have been lifted out of bagel cooker 20, a conventional, spring-loaded operator 178 on handle 168 is depressed to retract detents 174 toward base 172 and release bagel rack 38.

Figure 9:
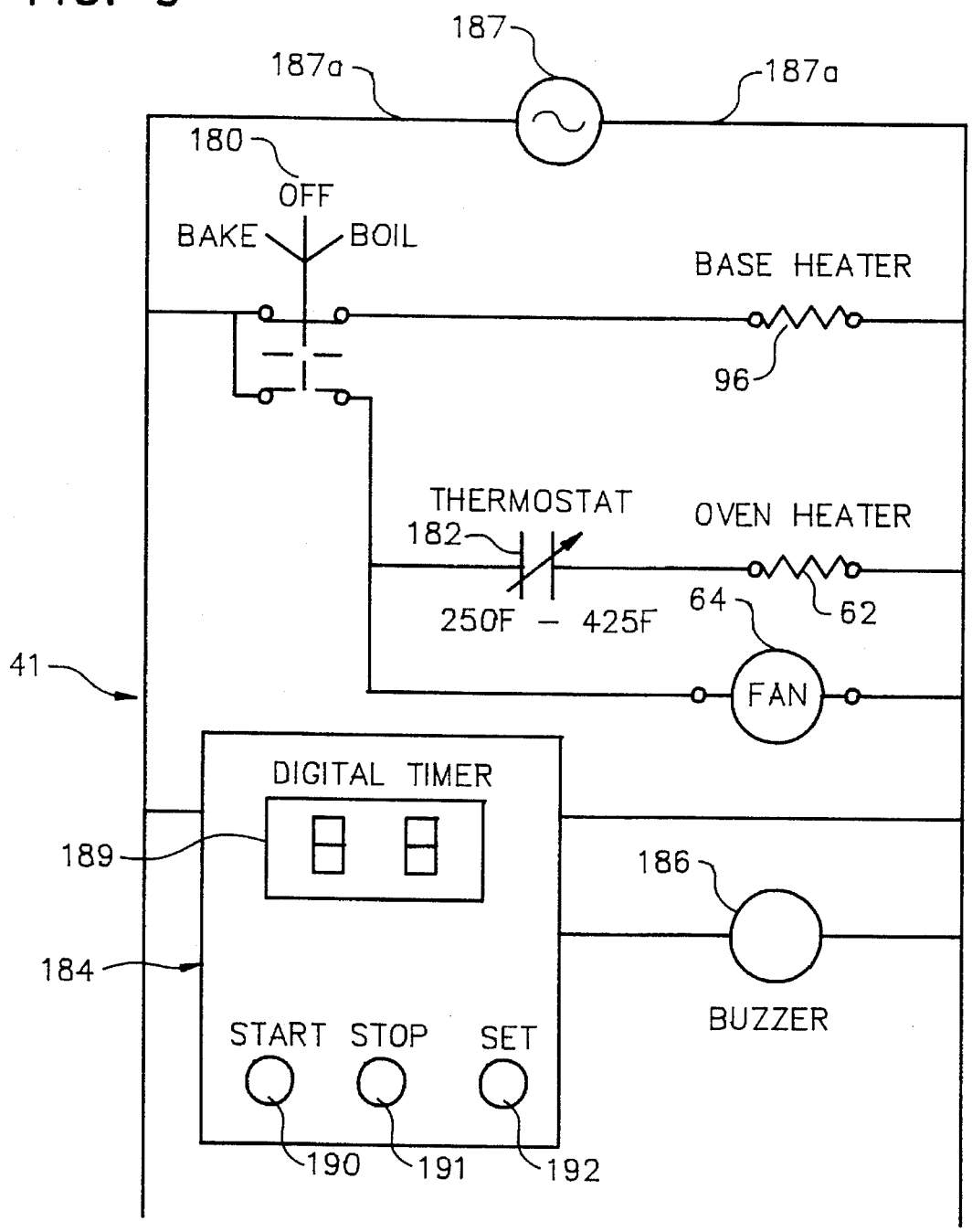
FIG. 9 is a schematic of the electrical components of the bagel cooker.

Turning now to FIG. 9, the control system 41 of bagel cooker 20 regulates the operation of the resistance heater 96 in the boiler zone of the bagel cooker and the heater 62 and fan 64 in convection oven zone 32. The control circuit includes a three-position switch 180, an oven zone thermostat 182, a digital timer 184, and an indicator such as the illustrated buzzer 186. Switch 180 has a BOIL position in which the heater 96 in the boiler zone 30 of bagel cooker 20 is connected across AC power source 187 by external cord 187a (see FIGS. 1 AND 9), an OFF position, and a BAKE position in which the fan 64 in the convection oven zone 32 of the bagel cooker is connected across the power source and the heater 62 in the oven section is connected across the power source through thermostat 182. The thermostat has an external control 188 (see FIG. 1) for adjusting the oven zone temperature, typically between 300° and 450° F.

Digital timer 184 is wired across AC power source 187 by external cord 187a. That component of bagel cooker 20 includes the customary elapsed (or remaining) time display 189, along with equally conventional START and STOP/RESET buttons 190 and 191 and a SET button 192 which can be repeatedly depressed to set a time selected by the user of bagel cooker 20. Buzzer 186 is connected across power source 187 through timer 184 and, as is conventional, is turned on when the set time is elapsed.

Bagel cooker is employed by loading uncooked bagels 76 onto bagel rack 36 and then rotating external knob 138 to lower the rack into the water 80 in the pan or inner casing 28 of the bagel cooker. SET button 192 is then employed to set digital timer 184 for the period of time required to bring water 80 to the boil and to then boil the bagels for an appropriate length of time. Three-position switch 180 is then set to BOIL, and button 190 is depressed to start timer 184. When the time elapses, buzzer 186 sounds; and the user moves switch 180 to the OFF position to turn off water heater 96. Next, knob 138 is rotated to elevate bagel rack 36 and the now boiled bagels to the convection oven section 32 of the bagel cooker (see FIG. 7). Then, SET button 192 and thermostat controller 188 are employed to set the baking time and temperature, switch 180 is moved to the BAKE position, and start switch 190 is depressed to start the timer for the baking cycle. Buzzer 186 will sound again when the baking time elapses. The user then moves switch 180 from the BAKE position to the OFF position to turn off convection heater 62 and convection fan 64, opens the cover 24 of the bagel cooker (see FIG. 6), and employs accessory 164 (FIG. 8) in the manner discussed above to remove bagel rack 36 and the now baked bagels 76 from the bagel cooker.

Figure 10:
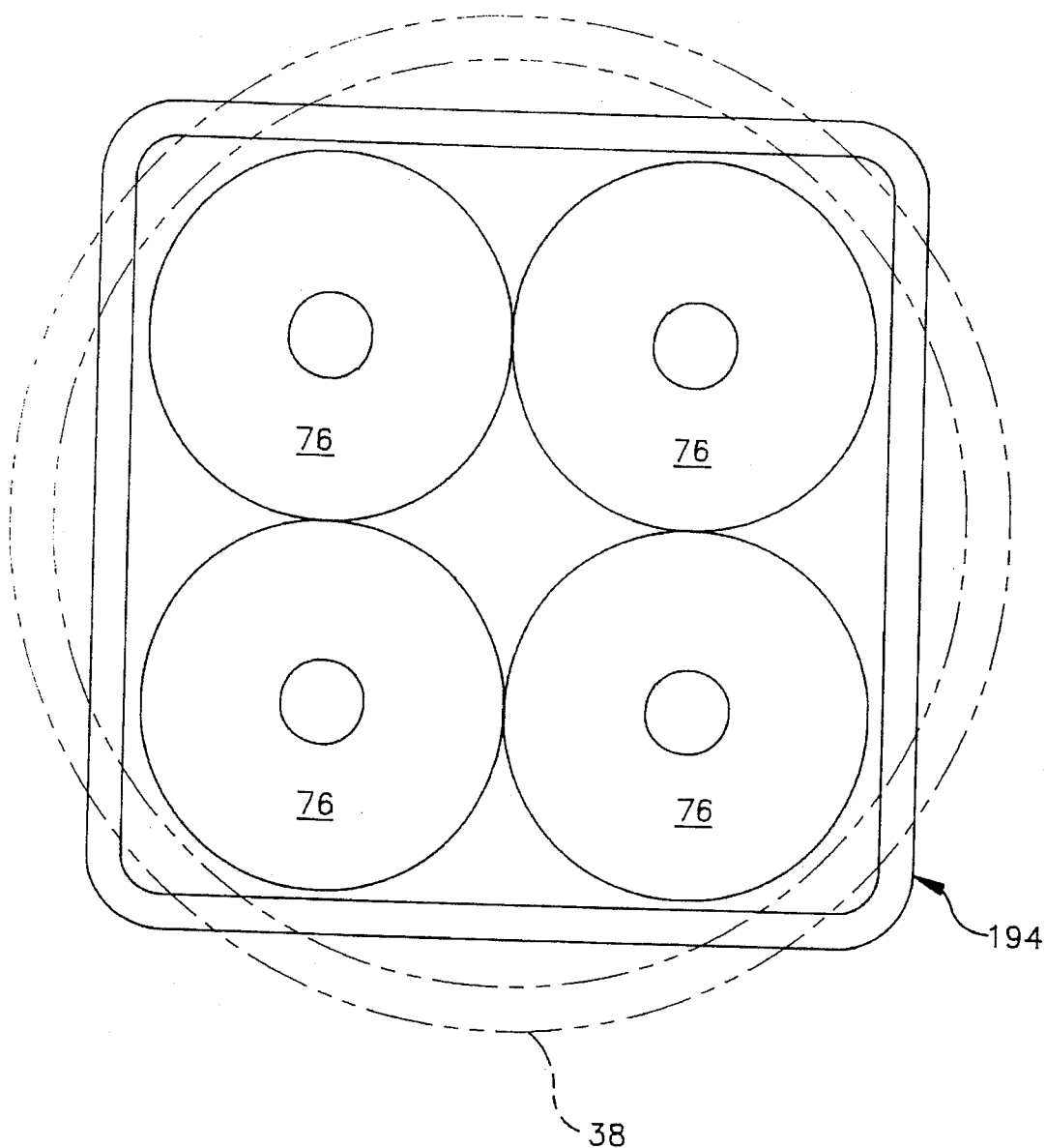
FIG. 10 is a partial—and schematic—view of a second bagel cooker embodying the principles of the present invention.

Bagel cookers embodying the principles of the present invention need not be of the particular construction illustrated in FIGS. 1–8 and discussed above. For example, the external dimensions of the bagel cooker outer casing can be reduced and the cooker thereby made more compact by employing a square configuration rather than a circular shown in FIG. 1. A bagel support arrangement of that configuration, identified by reference 194, is depicted in FIG. 10 along with a circular bagel support of comparable capacity for purposes of comparison.

Many other modifications may of course be made without exceeding the scope of the present invention. The invention may thus be embodied in many forms without departing from the spirit or essential characteristics of the invention. The present embodiments are therefore to be considered in all respects as illustrative and not restrictive. The scope of the invention is indicated by the appended claims rather than by the foregoing description, and all changes which come within the meaning and range of equivalency of the claims are therefore intended to be embraced therein.

What is claimed is:

1. Bagel cooking apparatus which comprises:

a casing;

a boiler zone in the lower reaches of said casing;

a first heater means in the lower reaches of the casing for heating water in said boiler zone;

an oven zone in the upper reaches of the casing;

a second, convection heater means in said oven zone;

an open-topped bagel support means; and a user-actuatable means for lowering said bagel support means to said boiler zone and for elevating said support means to said oven zone;

said convection heater being so positioned above said bagel support means that, with said support means elevated to said oven zone, air heated by the convection heater is discharged directly from said convection heater into said support means.

2. Bagel cooking apparatus as defined in claim 1 which comprises means employable by a user to independently control the operation of said first and second heater means.

3. Bagel cooking apparatus as defined in claim 1 in which the means for lowering and elevating the bagel support means comprises a toothed rack mounted to the bagel support means, a pinion having teeth meshing with the teeth on said rack, shaft means rotatably supporting said pinion from said casing, and means accessible from the exterior of the casing for rotating said shaft.

4. Bagel cooking apparatus as defined in claim 1 which includes an imperforate inner pan, surrounded by said casing, for holding water in which said bagels can be boiled.

5. Bagel cooking apparatus as defined in claim 4 which includes:

a first cover cooperable with said casing to isolate the interior of the casing; and a second cover for said water-holding inner pan, said second cover being supported from said first cover.

6. Bagel cooking apparatus as defined in claim 5 in which said second, convection heater means includes a heater and a fan, both supportable from said first cover in the oven section of the bagel cooker.

7. The combination of bagel cooking apparatus as defined in claim 1 and an accessory which is detachably connectable to said bagel support means and can be employed to remove said support means from said casing.

8. Bagel cooking apparatus as defined in claim 1 in which the bagel support means has generally imperforate side and bottom wall means and in which, with the bagel support means in said elevated position, the bagel support means cooperates with said casing to separate at least that part of the oven zone encompassed by the bagel support means from the boiler zone.

9. Bagel cooking apparatus as defined in claim 1 which comprises control means comprising: user-manipulatable switch means for routing electrical energy to a user-selected one of said first and second heater means, user-settable means for timing the operation of the selected heater means, and user-adjustable means for so controlling the operation of the second heater means as to regulate the temperature in said oven zone.

10. Bagel cooking apparatus as defined in claim 9 in which the convection heater means comprises a fan and a heater both located in said oven zone, said fan and said heater being so electrically connected that the fan is operated concomitantly with said second heater means and the latter is turned on and off as needed to maintain a selected temperature in said oven zone.

11. Bagel cooking apparatus as defined in claim 9 which comprises means for signalling that the time for which the timing means is set by a user has expired.

12. Bagel cooking apparatus as defined in claim 9 wherein said switch means has an OFF position in which neither of said first and second heaters is energized.

13. Bagel cooking apparatus which comprises:

a casing;

a boiler section in said casing, said boiler section comprising container means for water in which said bagels can be boiled;

an oven section in said casing; and means for collecting condensate formed during the operation of said apparatus;

said condensate collecting means comprising: a receptable which is removably supported from a wall of said casing and can be reached from the exterior of said casing and conduit means providing fluid communication between the interior of said inner casing and said receptacle.

14. Bagel cooking apparatus which comprises:

a casing;

a boiler zone in said casing;

an oven zone in the casing;

a bagel support means which is immobilizable in said boiler zone to boil bagels supported thereon and is subsequently immobilizable in said oven zone to bake the boiled bagels;

a user-actuatable means which is accessible from the exterior of the casing for moving said bagel support means from a location where uncooked bagels can be placed on said support means to said boiler zone, then to said oven zone, and thereafter to a location where baked bagels can be removed from the support means; and means for collecting condensate formed during the operation of said apparatus, said condensate collecting means comprising a receptacle and vent conduit means providing fluid communication between said boiler zone and said receptacle.

* * * * *